United States Patent
Coleman et al.

(10) Patent No.: US 8,095,367 B2
(45) Date of Patent: Jan. 10, 2012

(54) METHODS AND SYSTEMS FOR PARASITIC SENSING

(75) Inventors: Ronald Bruce Coleman, Arlington, MA (US); John Scott Knight, Cambridge, MA (US); George Shepard, Cambridge, MA (US); Richard Madden, Groton, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 1015 days.

(21) Appl. No.: 11/929,068

(22) Filed: Oct. 30, 2007

(65) Prior Publication Data

US 2008/0103767 A1    May 1, 2008

Related U.S. Application Data

(60) Provisional application No. 60/863,785, filed on Oct. 31, 2006.

(51) Int. Cl.
*G10L 21/00*    (2006.01)

(52) U.S. Cl. ......... 704/272; 704/231; 704/274; 704/278
(58) Field of Classification Search ............... 704/231, 704/272, 274, 278
See application file for complete search history.

(56) References Cited

U.S. PATENT DOCUMENTS

| 4,344,071 | A | * | 8/1982 | Allen | 340/566 |
| 5,650,773 | A | * | 7/1997 | Chiarello | 340/691.8 |
| 2005/0184867 | A1 | * | 8/2005 | Osann | 340/539.25 |
| 2007/0038444 | A1 | * | 2/2007 | Buck et al. | 704/235 |

* cited by examiner

*Primary Examiner* — Qi Han
(74) *Attorney, Agent, or Firm* — Ropes & Gray LLP

(57) ABSTRACT

Methods and systems of parasitic sensing are shown and described. The method includes, measuring, at a first time using one or more electrical elements native to a domain, a parameter of a circuit within the domain and measuring, at a second time using the one or more electrical elements native to the domain, the parameter. The method also includes, comparing the parameter measurement from the first time to the parameter measurement at the second time and determining, in response to the comparison, that an activity occurred within the domain.

18 Claims, 6 Drawing Sheets

METHODS AND SYSTEMS FOR PARASITIC SENSING

FIELD OF THE INVENTION

The present application relates to gathering information from objects within a domain. More specifically, the application relates to using existing objects of the domain as sensing devices to gather the information.

BACKGROUND OF THE INVENTION

Most domains (e.g., buildings and the like) include existing wired circuits. The circuits typically include various electrical devices. In covert operations, it is often desirable to leave the existing domain environment unmodified so as not to alert the target to the presence of the monitors. It is also desirable to track occupants of the domain as they travel within the domain.

SUMMARY OF THE INVENTION

In various aspects and embodiments, the application features systems and methods for covert localization of building occupants by monitoring fluctuations in the current draw of common electrical devices (e.g., light bulbs, computer screens, machinery, keyboards, etc.) resulting from acoustic excitation and/or vibrations produced by the movements, speech and other activities of the occupants. Advanced signal processing techniques may be applied to the received signals to reproduce the speech of building occupants from the current draw of these devices.

The use of common electrical devices as sensors is referred to as "parasitic sensors" throughout the specification. In one specific embodiment, an incandescent light bulb is a parasitic sensor and low frequency pressure fluctuations will produce whole-body motion of the surrounding glass. This motion causes the filament to bend and stretch at the excitation frequency. The resistance of the filament changes as the filament strains in response to these vibrations. As such, a sensor monitoring the current draw of the bulb (assuming a regulated voltage supply) exhibits current oscillations at the power line frequency (e.g., 60 Hz) plus sidebands at $+/-f_o$, where $f_o$ is the excitation frequency of the incident pressure wave. In effect, the filament can be viewed as a variable resistor, where the rate of variation is dictated by the frequency of the incident pressure wave.

Similarly, light bulbs can be used to detect vibrations caused by occupants other than by speech or sound. For example, similar principles can be used to detect 'foot-fall' vibrations. In addition to incandescent bulbs, it is possible that other electrical devices, including fluorescent bulbs and computer screens, will also produce a change in current that can be used as an indication of nearby occupants.

Assuming the circuit wiring for a building is known, detecting current fluctuations from parasitic sensors on a particular circuit will localize the excitation to those rooms serviced by that circuit, which provides a rough localization. If these excitations change to new circuits, then this is an indication that occupants of the building are moving from one room to another.

The use of advanced signal processing either using the fundamental carrier frequencies of 60 Hz and its harmonics, or by injecting a higher carrier frequency on the line, may allow demodulation of the parasitic sensor signals to bandwidths sufficient to extract speech signals. This would have significant impact on assessing and prosecuting hostage/terrorist situations.

In one aspect, a method of determining activity of an object within a domain using electrical elements of the domain is shown and described. The method includes, measuring, at a first time using one or more electrical elements native to a domain, a parameter of a circuit within the domain and measuring, at a second time using the one or more electrical elements native to the domain, the parameter. The method also includes, comparing the parameter measurement from the first time to the parameter measurement at the second time and determining, in response to the comparison, that an activity occurred within the domain.

In one embodiment, the method includes locating the occurrence of the activity within the domain. The method can also include comparing a location of the parameter measurements with a circuit map of the domain. In another embodiment, the method includes tracking a change in location of the activity in response to a change in the parameter.

In some embodiments, determining that an activity occurred includes executing a speech recognition algorithm to determine that the activity occurred within the domain. The method can also include extracting the speech. Also, the method can include determining that an audible sound occurred within the domain.

In another aspect, an apparatus is shown and described. The apparatus can include a circuit interface, measurement circuitry, and an interface module. The circuit interface module interfaces with at least one circuit of a domain. The measurement circuitry communicates with the circuit interface module and is configured to measure a parameter of at least one circuit of the domain. The interface module communicates with the measurement circuitry and is configured to communicate the parameter measurement to a computing system for further processing.

In one embodiment, the measurement circuitry comprises induction circuitry configured to monitor current.

In some embodiments, the computing system determines that an activity occurred in the domain in response to processing the received parameter measurement. In further embodiments, the computing system determines that an object moved within a domain in response to processing the received parameter measurement. In still another embodiment, the computing device extracts speech or audible sounds by processing the received parameter measurement.

In yet another aspect, a system for determining activity of an object within a domain using electrical elements of the domain is shown and described. The system includes means for measuring, at a first time using one or more electrical elements native to a domain, a parameter of a circuit within the domain and means for measuring, at a second time using the one or more electrical elements native to the domain, the parameter. The system also includes means for comparing the parameter measurement from the first time to the parameter measurement at the second time and means for determining, in response to the comparison, that an activity occurred within the domain.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
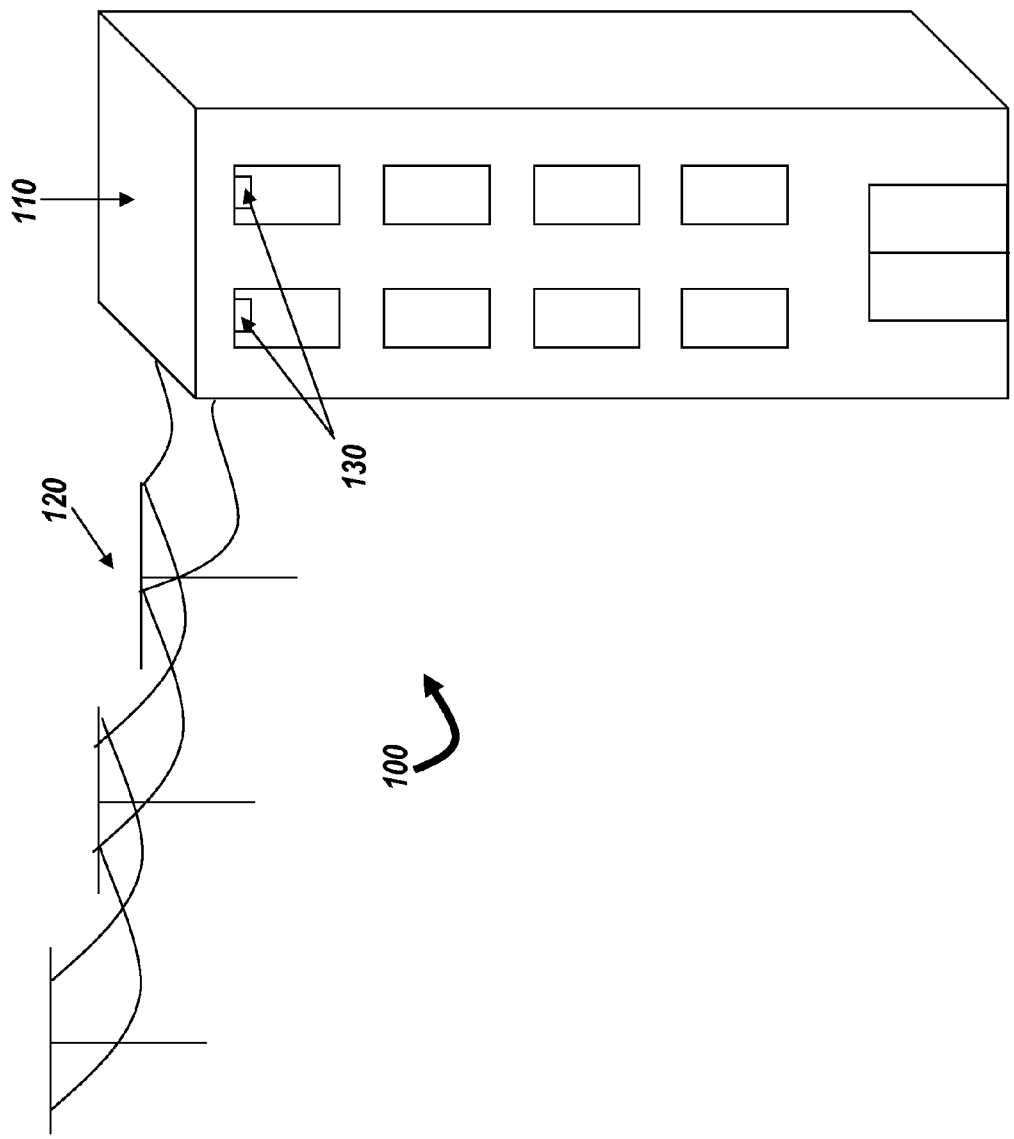
FIG. 1 shows an embodiment an of environment for application of parasitic sensing.

In urban warfare or law-enforcement situations, there is a desire to determine if a building is occupied, the types of occupants (e.g., friends and/or foe), and where people are located within buildings before entering the building. For example, in a hostage situation, it is desirable to learn or sense the locations of friend and foe personnel traceable to specific floors and preferably to individual rooms. Because of the nature of urban warfare or law enforcement, it may be important to obtain this information in a covert manner such that the building occupants are unaware that the information is being obtained. The following addresses an approach for covert localization of building occupants by monitoring fluctuations in the current draw of common electrical devices (e.g., light bulbs, computer screens, keyboards, machinery, etc.) resulting from acoustic excitation and/or vibrations produced by the movements, speech and other activities of the occupants. Advanced signal processing techniques can be applied to reproduce the speech of building occupants from the current draw of these devices.

This use of common electrical devices as sensors is referred to as 'parasitic sensing'. For the particular case of an incandescent light bulb, low frequency pressure fluctuations in the air will produce whole-body motion of the glass surround. This motion will cause the filament to bend and stretch at the excitation frequency. The resistance of the filament will change as the filament strains in response to these vibrations. As such, a sensor monitoring the current draw of the bulb (assuming a regulated voltage supply) will show current oscillations at the power line frequency (e.g., 60 Hz) plus sidebands at $+/-f_o$, where $f_o$ is the excitation frequency of the incident pressure wave. In effect, the filament can be viewed as a variable resistor, where the rate of variation is dictated by the frequency of the incident pressure wave. The net current will be a 60 Hz tone (or perhaps some other higher-frequency carrier that is injected for the purpose of expanding the bandwidth of this approach) modulated by the excitation frequency $f_o$.

Similarly, the light bulbs could be used to detect vibrations caused by occupants other than by speech or sound. For example, the same principle could be used to detect 'foot-fall' vibrations. In addition to incandescent bulbs, it is possible that other electrical devices, including fluorescent bulbs and computer screens, will also produce a change in current that can be used as an indication of nearby occupants.

In some embodiments, a combination of advanced signal processing techniques and possible injection of higher-frequency carrier signals can be used to detect occupant-induced responses in the measured current signals of common electrical devices. The signal processing would be used to demodulate the resulting current signals to reproduce the speech or other acoustic activities causing the measured current signal. The maximum bandwidth over which the demodulated signal would be useful for interpreting speech and or vibrations is equal to one-half the carrier frequency. As such, using only the 60 Hz line frequency carrier would be insufficient to reproduce speech. In some embodiments, if a high frequency carrier (e.g., 3 kHz) is injected into the circuit. The modulations about the carrier are used to interpret speech when the signal is sufficiently above the noise.

With reference to FIG. 1, an embodiment of an environment 100 in which a parasitic sensing system can be used is shown and described. The environment 100 includes a domain 110 that operates by receiving electrical power via power lines 120. As used herein, a domain refers to any physical location that includes electrical devices. For example, an office building or home can be a domain. Also, a park having lighting can be thought of as a domain. A domain 110 will have one or more electrical circuits (not shown) that supply power to one or more electrical devices 130. As used herein, electrical devices refer to any device that receives electrical power. Examples of electrical devices include, but are not limited to, light bulbs, computers, keyboards, monitors, televisions, appliances, machinery, as well as other electrically powered devices. An additional feature of the electrical device can include the ability to have one or more characteristics of the electrical device affected by acoustic or other types of vibrations to thereby alert the characteristic. One of many examples includes the length of the filament of a light bulb. As the glass surrounding the filament is exposed to vibrations, the filament can expand or contract. The change in the length of the filament causes changes in the resistance of the light bulb and thus its load on the circuit. These changes can be analyzed using techniques described herein to provide localization of objects within the domain as well as other data.

Figure 2:
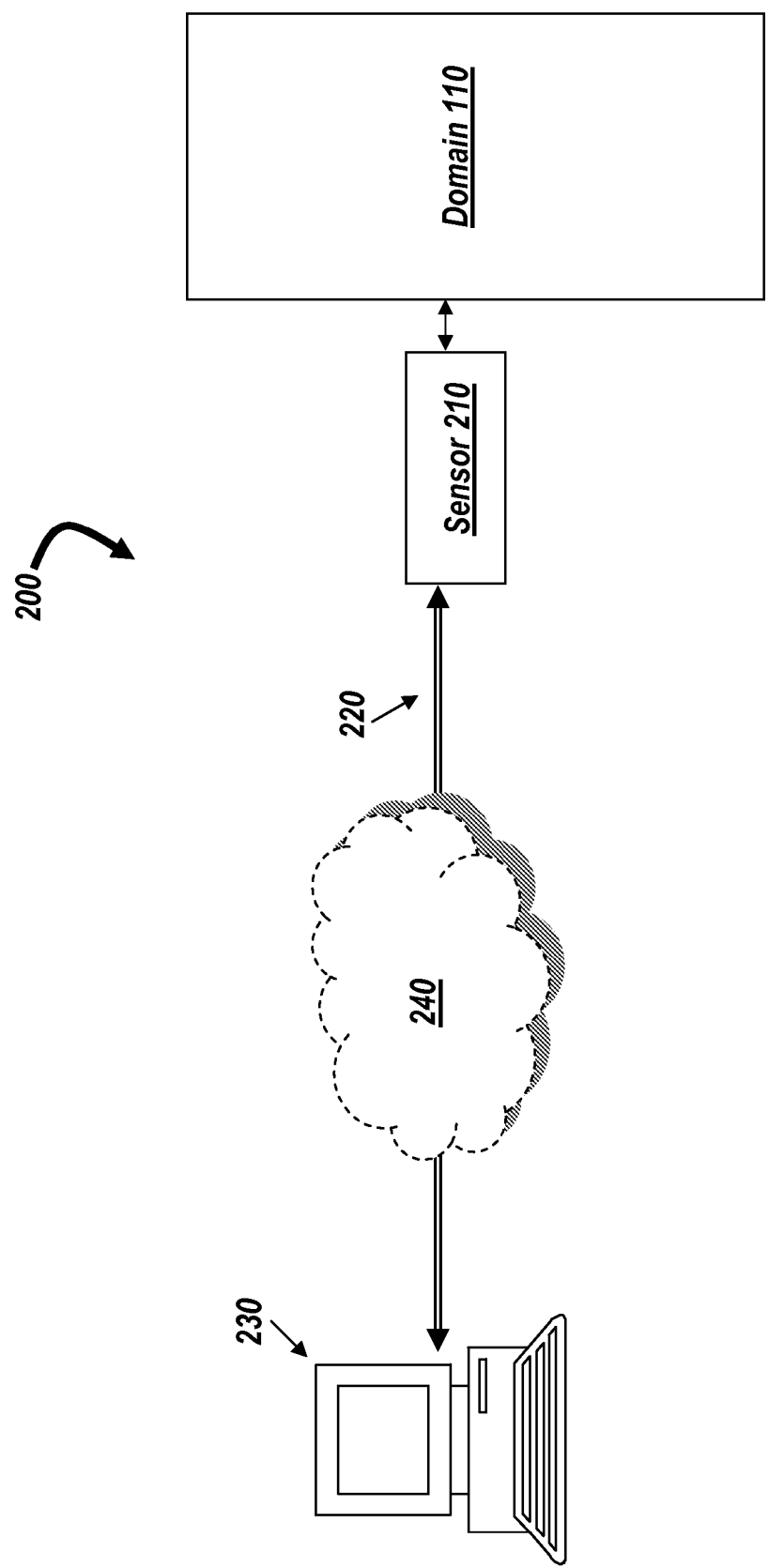
FIG. 2 shows an embodiment of a system for parasitic sensing.

With reference to FIG. 2 a parasitic sensing system 200 is shown and described. In one embodiment, the system includes a sensor 210, a communications path 220, and a computing system 230. The sensor 210 is in communication with one or more circuits of the domain 110. In one embodiment, the sensor 210 is placed in a "junction box" of the domain 110. The junction box provides access to the circuits of the domain. The sensor 210 can sense changes in one or more characteristics of a circuit of the domain 110. For example, a current sensor can monitor changes in current of the circuit of the domain 110. It should be understood that a sensor can monitor more than one circuit of the domain 110.

The sensor 210 communicates with a computing system 230 via a communications path 220. In one embodiment, the communications path can include a network 240 thereby providing remote communications between the computing system 230 and the sensor 210 across a large geographic area. Although a single sensor 210, communications paths 220, and computing system 230 are shown, it should be understand that varying numbers of components of the system 200 can be used. For example, three sensors 210 and two computing devices 230 can be used with only a single communications paths 220.

The network 240 can be any type of network that provides communications between the computing device 230 and the sensor 210. For example, the network 240 can be a local-area network (LAN), a medium-area network (MAN), or a wide area network (WAN) such as the Internet or the World Wide Web. In another embodiment, the network 240 can be a peer-to-peer network or an ad-hoc wireless network. The sensor 210 and the computing device 230 connect to the network 240 via communications link 220 using any one of a variety of connections including, but not limited to, standard telephone lines, LAN or WAN links (e.g., T1, T3, 56 kb, X.25), broadband connections (ISDN, Frame Relay, ATM), and wireless connections. The connections can be established using a variety of communication protocols (e.g., TCP/IP, IPX, SPX, NetBIOS, and direct asynchronous connections).

In other embodiments, the sensor 210 communicates with the computing system 230 through a second network (not shown), through a communication link that connects network 240 to the second network. The protocols used to communicate through communications link can include any variety of protocols used for long haul or short transmission. For example, TCP/IP, IPX, SPX, NetBIOS, NetBEUI, SONET and SDH protocols. The combination of the networks can be conceptually thought of as the Internet. As used herein, Internet refers to the electronic communications network that connects computer networks and organizational computer facilities around the world.

The sensor 210 and computer 230 can communicate directly with each other in a peer-to-peer fashion or through a server (not shown). For example, in some embodiments a communication server facilitates communications among the sensor 210 and the computing system 230. The server can provide a secure channel using any number of encryption schemes to provide secure communications among the computing system 230 and the sensor 210.

During operation, the sensor 210 transmits data (e.g., measurements of electrical characteristics of a circuit) to the computer system 230 via communications path 220. Once received, the computer system 230 analyzes the received data by executing signal processing software and other software. The output of the signal processing software can be presented to one or more end-users of the computer system 230. The output can take many forms depending on the desired result. For example, a map tracking the movement of a person within in the domain 110 can be shown. In other embodiments, actual speech among individuals of the domain is presented via speakers (not shown) to the end-user.

Figure 3:
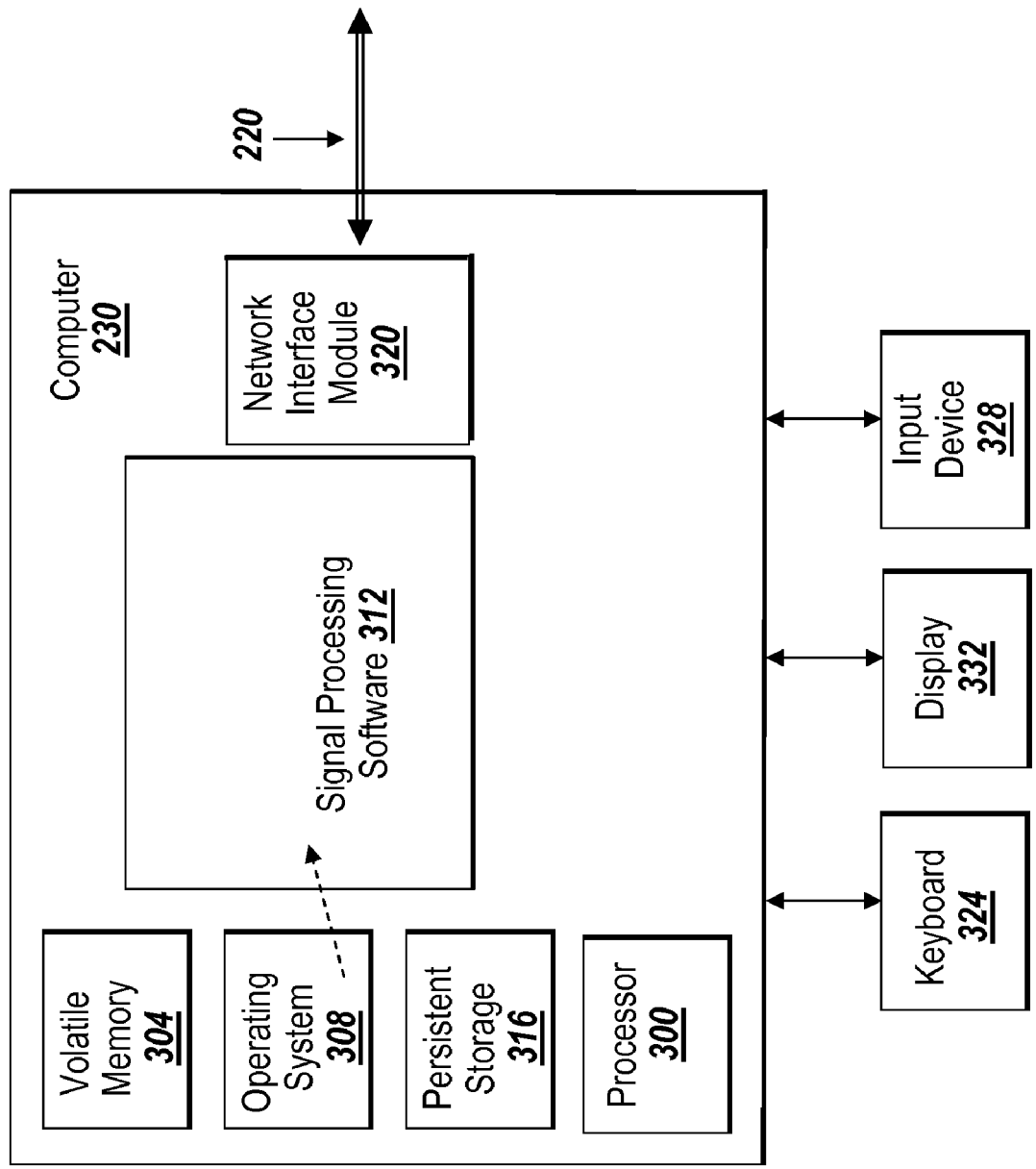
FIG. 3 depicts a block diagram of an embodiment of a computer system for implementing signal processing algorithms used in parasitic sensing.

With reference to FIG. 3, a conceptual block diagram of an embodiment of a computer system 230 is shown and described. It should be understood that other embodiments of the computing system 230 can include any combination of the following elements or include other elements not explicitly listed. In one embodiment, the computing system 230 typically includes a processor 300, volatile memory 304, an operating system 308, signal processing software 312, a persistent storage memory 316 (e.g., hard drive or external hard drive), a network interface 320 (e.g., a network interface card), a keyboard 324 or virtualized keyboard in the case of a PDA, at least one input device 328 (e.g., a mouse, trackball, space ball, light pen and tablet, touch screen, stylus, and any other input device) in electrical communication with the computer system 230, and a display 332. The operating system 308 can include, without limitation, WINDOWS 3.x, WINDOWS 95, WINDOWS 98, WINDOWS NT 3.51, WINDOWS NT 4.0, WINDOWS 2000, WINDOWS XP, WINDOWS VISTA, WINDOWS CE, MAC/OS, MAC LEOPARD, JAVA, PALM OS, SYMBIAN OS, LINSPIRE, LINUX, SMARTPHONE OS, the various forms of UNIX, WINDOWS 2000 SERVER, WINDOWS SERVER 2003, WINDOWS 2000 ADVANCED SERVER, WINDOWS NT SERVER, WINDOWS NT SERVER ENTERPRISE EDITION, MACINTOSH OS X SERVER, UNIX, SOLARIS, and the like. In addition, the operating system 308 can run on a virtualized computing machine implemented in software using virtualization software such as VMWARE. Although shown as a single computer system, in other embodiments multiple computer systems, as well as servers, can be used.

In operation, the signal processing software 312 communicates with various components (e.g., the operating system 308) of the computing system 230 and receives measurement data from the sensor 210. As a general overview, the signal processing software 312 provides various functionality depending on the desired monitoring scheme. For example, the signal processing software 312 can provide location information about a subject within the domain 110. Another example includes speech reconstruction among subjects of the domain. It should be understood that other features can be provided by the signal processing software 312. The results presented to the end-user of the computer system 230 can be in various forms. For example, a map tracking the location of a subject within the domain can be presented to the end-user of the computer system 230. Another example is an audible presentation of reconstructed speech. Various combinations of both audio and visual components can also be presented to the end-user.

Figure 4:
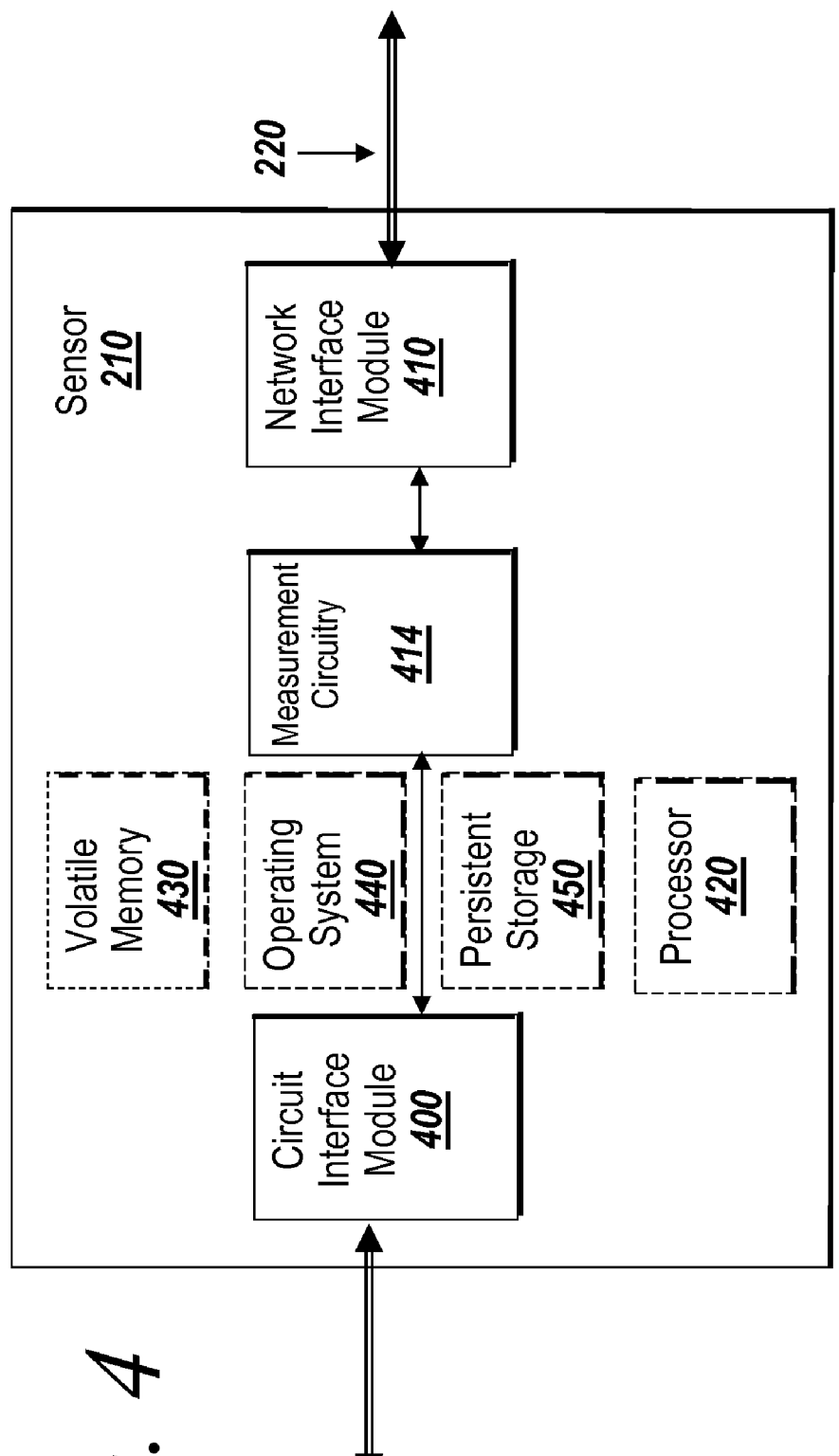
FIG. 4 depicts a block diagram of an embodiment of a sensor for measuring a circuit of a domain.

With reference to FIG. 4, a conceptual block diagram of an embodiment of a sensor 210 is shown and described. The sensor can include a circuit interface module 400, a network interface module 410, and measurement circuitry 414. In other embodiments, the sensor 210 can include optional circuitry such as a processor 420, volatile memory 430, an operating system 440, and a persistent storage memory 450. The measurement circuitry 414 communicates with the circuit interface module 400 to access the circuits of the domain 100 and also communicates with the network interface module 410 to communicate data to the computer system 230.

The measurement circuitry 414 can include various electrical components configured to measure one or more characteristics of one or more circuits of the domain 110. In one embodiment, the measurement circuitry is configured to measure the current of a circuit of the domain 110. For example, induction pickup sensors can be used as a non-intrusive way to monitor and measure the current in a circuit. In another embodiment, the measurement circuitry 414 is configured to measure voltage. It should be understood that other configurations and combinations of circuitry can be used to provide measurements of other electrical characteristics of a circuit of the domain 110.

The circuit interface module 400 communicates with one or more circuits of the domain. In one embodiment, the circuit interface module 400 interfaces with one or more circuits of a building via a junction box, a breaker box, a patch board, or some similar device.

The network interface module 410 communicates the measurement data back to the computer system 230 via the communications path 220. The protocols used to communicate through the communications link can include any variety of protocols used for long haul or short transmission. For example, TCP/IP, IPX, SPX, NetBIOS, NetBEUI, SONET and SDH protocols. Wired or wireless communications can be used in various embodiments of the invention.

Figure 5:
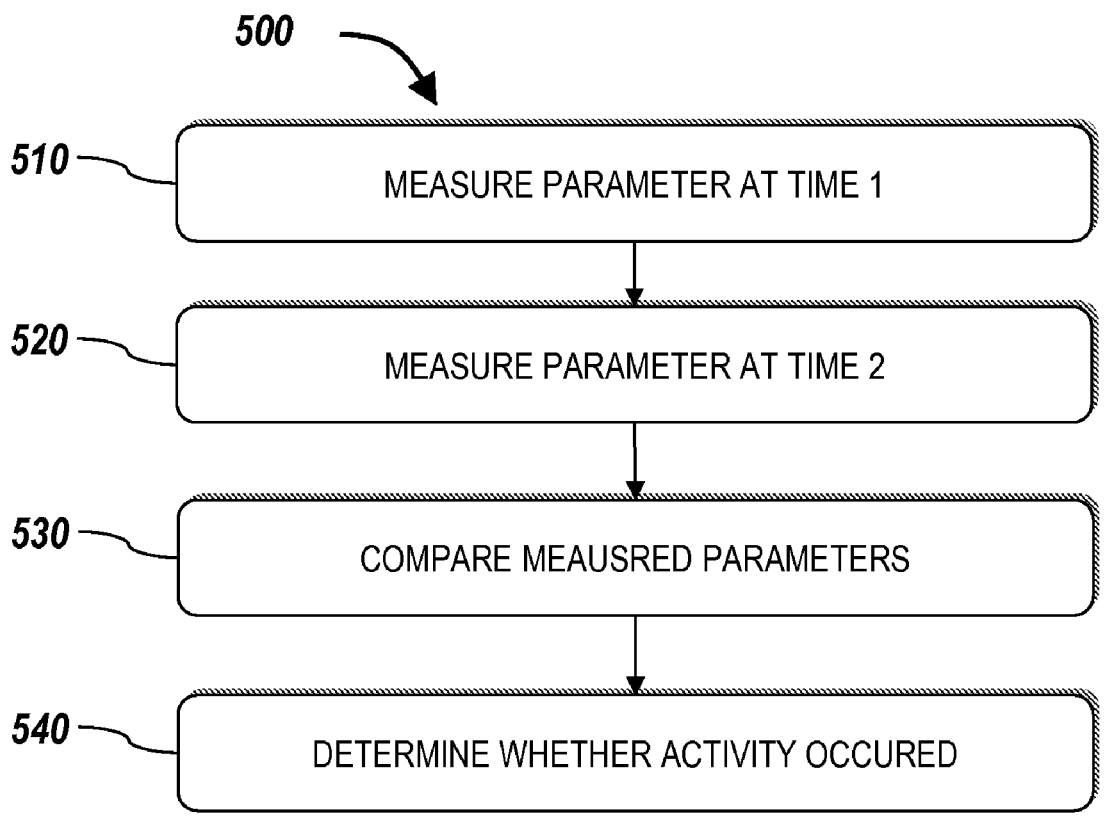
FIG. 5 depicts a flow chart of an embodiment of a method of parasitic sensing.

With reference to FIG. 5, an embodiment of a method 500 of determining activity of an object within a domain using electrical elements of the domain is shown and described. The method 500 includes measuring (STEP 510), at a first time using one or more electrical elements native to the domain, a parameter of the circuit of the domain and measuring (STEP 520), at a second time, using the one or more electrical elements of the domain the parameter. The method also includes comparing (STEP 530) the parameter measurements and determining (STEP 540) whether an activity occurred.

In one embodiment, the measuring (STEP 510) includes using one or more sensors 210 described above in combination with elements of the domain. For example, a light bulb can be used as a "sensor" to detect activity within the domain. Various parameters such as voltage, current, impedance or any other electrical parameter can be measured. The measurement occurs at a first time to generate a first measurement.

In one embodiment, the second measuring (STEP 520) occurs using the same electrical element of the domain is used. In another embodiment, a different electrical element of the domain is used.

In one embodiment, the computing system 230 compares (STEP 530) first parameter measurement to the second parameter measurement. In another embodiment, the sensor 210 performs the comparison. The comparison can be of the measured parameters or of a transformed version of the measured parameters. Said another way, the measurements can be processed prior to being compared, in some embodiments. For example, some post processing on the received signals can be employed. The resulting processed signal can be compared to a circuit map of a building to determine the location and/or movement of an object of interest.

In one embodiment, the computing system 230 determines (STEP 540) that an activity occurred within the domain. In another embodiment, the sensor 210 makes the determination. For example, using the compared parameter values it may be determined that an object (e.g., a person) is moving away from the electrical element of the domain. In other embodiments, speech and other audible data can be extracted from the compared parameter measurements.

In summary, the method 500 can be used, in various embodiments, to determine if there was human or machinery activity in the domain. Further, the method 500 can be used to understand where the activity was occurring by correlating current fluctuation consistent with the measured activity to a circuit map of a building. Tracking the movement of objects is a derivative of this capability. Yet another aspect of the method 500 is to determine what the activity was using, in some embodiments, speech or other interpretable sounds.

Figure 6:
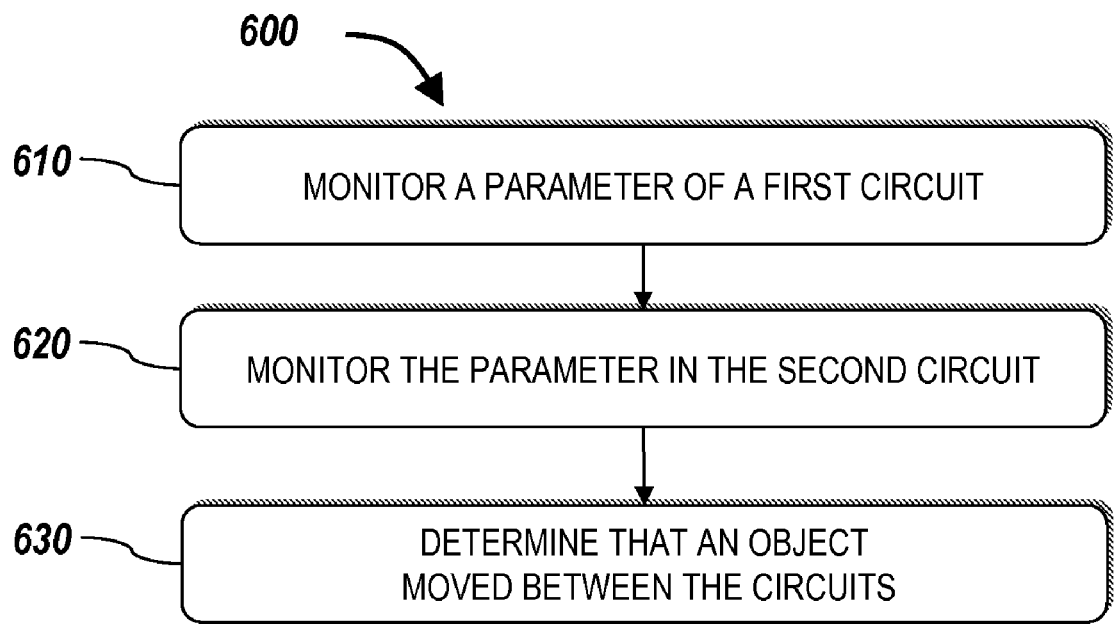
FIG. 6 depicts a flow chart of another embodiment of a method of parasitic sensing.

With reference to FIG. 6, an embodiment of a method 600 of parasitic sensing is shown and described. The method 600 includes monitoring (STEP 610) a parameter of a first circuit defining a first location within the domain, monitoring (STEP 620) the parameter in a second circuit defining a second location of the domain, and determining (STEP 630) that the object moved from the first location to the second location when the parameter changes in the second circuit.

As previously described, a sensor 210 can be attached to a junction box of a building and configured to monitor the current of a given circuit. Assuming that there are one or more parasitic sensors attached to that circuit, for example one or more incandescent light bulbs, as a subject moves around within the area covered by that circuit variations in the current are detected by the sensor 210. The pressure changes and vibrations caused by the subject induce whole body motion of the incandescent light bulb. The motion causes the filament to bend and stretch and produce a change in the impedance of the filament at excitation frequencies. These changes result in impedance modulation that can be measured by monitoring the current through the light bulb. The measurements are provided to the computer system 230 for analysis.

A second sensor 210 can be attached to a second circuit of the building and configured to monitor the current of the circuit. Assuming that there are one or more parasitic sensors attached to that circuit, for example one or more incandescent light bulbs, as a subject moves around within the area covered by that circuit variations in the current are detected by the sensor 210. The pressure changes and vibrations caused by the subject induce whole body motion of the incandescent light bulb. The motion causes the filament to bend and stretch and produce a change in the impedance of the filament at excitation frequencies. These changes result in impedance modulation that can be measured by monitoring the current through the light bulb. The measurements are provided to the computer system 230 for analysis.

The computer system 230 receives the measurements and performs various processing thereon. In one embodiment, the computer system 230 processes the received measurements and provides localization of the individual of the building. In one embodiment, this is accomplished by utilizing the circuit architecture in the building or circuit diagrams in combination with the current measurements of each suspected circuit as discussed above. Decoded (i.e., demodulated) current signals that are determined to contain information corresponding to nearby occupants could be traced to the floor and room(s) supported by that circuit.

In addition to providing localization, the above-described techniques can be used to determine what types of machinery are operating in a domain. For example, comparing a current spectra to a list of known current spectra can result in the determination that a specific type of machinery is in use on a certain circuit of the building.

Another use can be the determination of the opening and closing of doors within a domain. Also, the determination that a firearm was discharged can be achieved using the above-described principles.

In certain applications, speech can be extracted. In such a situation, digital signal processing algorithms operate on the received measurements to reconstruct the speech that was modulated on the low frequency carrier (e.g., 60 Hz) used to deliver power throughout the building. If the frequency used to deliver power to the building is not favorable to speech recognition, a higher frequency carrier signal can be injected into the circuit through the sensor 210. The speech could be modulated onto that higher frequency carrier and extracted using digital signal processing techniques.

Another feature provided by the described methods and systems is the creation and storage of data for the use in developing parasitic sensors. For example, data generated using different types of light bulbs having filaments constructed of different materials can be analyzed by the computer system 230 to develop filaments that are more sensitive than known filaments for any of the above-presented detection schemes. The generated data can also be used to develop bulbs, keyboards, computers, displays, or other electrical devices that can be used for parasitic sensing. In other embodiments, the filament of the light bulb is unchanged, however the base of the light bulb is modified to support additional rigid-body motion of the light bulb. In such a situation, the filament of the light bulb may bend and stretch to create current fluctuations due to the inertia of the filament.

Certain aspects of the previously described embodiments may be implemented as a method, apparatus or article of manufacture using programming and/or engineering techniques to produce software, firmware, hardware, or any combination thereof. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electrical devices, a computer readable non-volatile storage unit (e.g., CD-ROM, floppy disk, hard disk drive, etc.), a file server providing access to the programs via a network transmission line, wireless transmission media, signals propagating through space, radio waves, infrared signals, etc. The article of manufacture includes hardware logic as well as software or programmable code embedded in a computer readable medium that is executed by a processor. Of course, those skilled in the art will recognize that many modifications may be made to this configuration without departing from the scope of the present application.

Although the present invention has been described with reference to specific details, it is not intended that such details should be regarded as limitations upon the scope of the invention, except as and to the extent that they are included in the accompanying claims.

What is claimed is:

1. A method of detecting an activity within a domain using electrical elements of the domain, the method comprising:
    measuring, at a first time using one or more electrical elements native to a domain, a parameter of a power circuit carrying power to the one or more of the native electrical elements within the domain, wherein the parameter varies in response to the activity occurring proximate the respective electrical element;
    measuring, at a second time using the one or more electrical elements native to the domain, the parameter;
    comparing the parameter measurement from the first time to the parameter measurement at the second time; and
    determining, in response to the comparison, that an activity occurred within the domain.

2. The method of claim 1 further comprising locating the occurrence of the activity within the domain.

3. The method of claim 2 wherein locating the occurrence comprises comparing the parameter measurements with a circuit map defining locations within the domain.

4. The method of claim 1 further comprising tracking a change in location of the activity in response to a change in the parameter.

5. The method of claim 1 wherein detecting an activity comprises measuring current fluctuations on the power circuit and determining whether the frequencies of the fluctuations indicate that the activity occurred within the domain.

6. The method of claim 5 further comprising analyzing the measured frequencies to determine if the measured frequencies indicate the occurrence of the activity.

7. The method of claim 1 wherein determining that an activity occurred comprises determining that an audible sound occurred within the domain.

8. An apparatus comprising:
    a circuit interface module configured to interface with at least one power circuit having one or more native electrical elements physically located within a domain;
    measurement circuitry in communication with the circuit interface module, the measurement circuitry configured to measure a parameter of the at least one power circuit of the domain wherein the parameter varies in response to an activity occurring proximate a respective native electrical element; and
    an interface module in communication with the measurement circuitry, the interface module configured to communicate the parameter measurement to a computing system for further processing.

9. The apparatus of claim 8 wherein the measurement circuitry comprises induction circuitry configured to monitor current.

10. The apparatus of claim 8 wherein the computing system determines that an activity occurred in the domain in response to processing the received parameter measurement.

11. The apparatus of claim 8 wherein the computing system determines that an object moved within a domain in response to processing the received parameter measurement.

12. The apparatus of claim 8 wherein the native electrical element comprises a light bulb.

13. A system for detecting an activity within a domain using electrical elements of the domain, the system comprising:
    means for measuring, at a first time using one or more electrical elements native to a domain, a parameter of a power circuit carrying power to the one or more of the native electrical elements within the domain wherein the parameter varies in response to the activity occurring proximate the respective native electrical element;
    means for measuring, at a second time using the one or more electrical elements native to the domain, the parameter;
    means for comparing the parameter measurement from the first time to the parameter measurement at the second time; and
    means for determining, in response to the comparison, that an activity occurred within the domain.

14. The system of claim 13 further comprising means for locating the occurrence of the activity within the domain.

15. The system of claim 14 wherein the means for locating the occurrence comprises means for comparing the parameter measurements with a circuit map defining locations within the domain.

16. The system of claim 13 further comprising means for tracking a change in location of the activity in response to a change in the parameter.

17. The system of claim 13 wherein the electrical elements native to the domain include light bulbs.

18. The system of claim 17 wherein the light bulbs include incandescent light bulbs and fluorescent light bulbs.

* * * * *